(12) United States Patent
Pianezze et al.

(10) Patent No.: US 8,243,416 B2
(45) Date of Patent: Aug. 14, 2012

(54) HIGH EFFICIENCY GAS LIGHTING DEVICE FOR AN ELECTRIC HOUSEHOLD APPLIANCE

(75) Inventors: Daniele Pianezze, Cassano Magnago (IT); Massimo Aleardi, Cassano Magnago (IT)

(73) Assignee: ITW Industrial Components S.R.I. Con Unico Socio, Milan (IT)

( * ) Notice: Subject to any disclaimer, the term of this patent is extended or adjusted under 35 U.S.C. 154(b) by 289 days.

(21) Appl. No.: 12/529,326

(22) PCT Filed: Mar. 25, 2008

(86) PCT No.: PCT/IB2008/000696
§ 371 (c)(1),
(2), (4) Date: Aug. 31, 2009

(87) PCT Pub. No.: WO2008/117160
PCT Pub. Date: Oct. 2, 2008

(65) Prior Publication Data
US 2010/0014209 A1 Jan. 21, 2010

(30) Foreign Application Priority Data
Mar. 26, 2007 (IT) .............................. TO2007A0217

(51) Int. Cl.
*F23Q 3/00* (2006.01)
(52) U.S. Cl. ..................................................... 361/263
(58) Field of Classification Search .................. 361/263, 361/247, 253, 261
See application file for complete search history.

(56) References Cited

U.S. PATENT DOCUMENTS
4,293,903 A 10/1981 Mochida et al.
(Continued)

FOREIGN PATENT DOCUMENTS
EP 1469255 A 10/2004
GB 2050085 A 12/1980

OTHER PUBLICATIONS
European Search Report for PCT/IB2008/000696 Filed Mar. 25, 2008.

*Primary Examiner* — Rexford Barnie
*Assistant Examiner* — Christopher Clark
(74) *Attorney, Agent, or Firm* — Lowe Hauptman Ham & Berner LLP

(57) ABSTRACT

A gas lighting device including: a body formed by an electrically insulating material carrying a plurality of high-voltage outputs for the connection of spark generating means; a transformer accommodated in the body and including a primary winding wound around and carried by a ferromagnetic material core, a carrying element formed by an electrically insulating material and designed to contain the primary winding therein, and a secondary winding consisting of a plurality of coils externally carried by the carrying element, electrically insulated from the primary winding and essentially coaxial with the latter; the core is ring-shaped on a plane parallel to an axis (A) of the windings and consists of two half rings reciprocally coupled and arranged facing and closely adjacent to each other in the direction of the axis of the windings; a first circumferential portion of the ring-shaped core, formed by one or both of the half rings, is accommodated inside the carrying element so as to be surrounded by the windings, while a second circumferential portion of the core is formed parallel to the first and radially on the outside of the windings so as not to be surrounded by the same.

13 Claims, 2 Drawing Sheets

U.S. PATENT DOCUMENTS

| | | | |
|---|---|---|---|
| 4,358,813 A | 11/1982 | Sato et al. | |
| 6,429,606 B1* | 8/2002 | Aleardi et al. | 315/363 |
| 2005/0052819 A1* | 3/2005 | Pianezze | 361/263 |
| 2005/0068143 A1 | 3/2005 | Behr et al. | |
| 2008/0090191 A1* | 4/2008 | Graham | 431/258 |

* cited by examiner

HIGH EFFICIENCY GAS LIGHTING DEVICE FOR AN ELECTRIC HOUSEHOLD APPLIANCE

RELATED APPLICATIONS

The present application is based on International Application Number PCT/IB2008/000696 filed Mar. 25, 2008, and claims priority from Italian Application Number TO2007A000217 filed Mar. 26, 2007, the disclosures of which are hereby incorporated by reference herein in their entirety.

TECHNICAL FIELD

The present invention relates to a gas lighting device of the type intended to equip an electric household appliance, such as for example a cooking range, presenting high electric efficiency and, therefore, low consumptions and small size.

BACKGROUND ART

It is known that the electronic gas lighting devices currently present on the market, e.g. of the type described in EP-A-1469255 to the same Applicant, comprise a casing formed by electrically insulating material, in which high-voltage pulse generator means are arranged comprising electronic control means and a transformer provided with a primary winding and a secondary winding, the latter consisting of a plurality of coils, carried by at least one element formed by electrically insulating material consisting of a drum in which the primary winding is accommodated, along with a ferrite bar forming the ferromagnetic core, and externally to which the coils forming the secondary winding are wound.

Even though the known devices are entirely satisfactory from the technical point of view, they however display a relatively low electric efficiency which forces to use a relatively large amount of electric material for the construction thereof, in particular in the windings in order to achieve the required performance levels.

The known gas lighting devices available today thus present relatively high cost and large size. In particular, the device known from EP-A-1469255 already displays many improvements from this point of view, in addition to brilliantly solving the specific problem of cost-effectively and simply equipping cooking ranges provided with either an even or an odd number of burners, but does not fully solve the technical problems of reaching a better electric efficiency of the transformer.

In general terms, such a specific problem could be at least attenuated, if not solved, by using transformers in which the ferrite core, instead of being formed by a straight bar, with consequent possible dispersion of magnetic flux from the ends, is C-shaped with facing ends, such as for example in the transformer present in the supply device for electric lamps known from EP-A-1189314. However, the simple carryover of such different transformer design to the field of electronic gas lighting devices is not possible because, on one hand, it is not at all suited to the current layout of gas lighting devices and would make the assembly thereof extremely complex and costly and, on the other hand, would be likely to increase the size, thus obtaining a result opposite to the desired one which consists in reducing the production and assembly costs and the size of the finished gas lighting device.

DISCLOSURE OF INVENTION

It is thus the object of the present invention to improve the known gas lighting devices by providing an electronic gas lighting device displaying a reduced size and high assembly ease and which may be manufactured and assembled with low costs, in particular having a structure such that it can be assembled widely using pre-mounted parts, possibly by means of simple operations, which may be performed by automatic machines.

The present invention thus relates to an electronic gas lighting device for an electric household appliance, in particular for a cooking range, as defined in claim 1.

In particular, the gas lighting device according to the invention comprises: a body formed by an electrically insulating material and carrying a plurality of high-voltage outputs for the connection to spark generating means of the cooking range; and a transformer housed in the body and in turn comprising a primary winding wound around and carried by a ferromagnetic material core, a carrying element formed by an electrically insulating material and designed to contain the primary winding therein, and a secondary winding consisting of a plurality of coils externally carried by the carrying element, electrically insulated from the primary winding and essentially coaxial with the latter.

According to a first aspect of the invention, the core is ring-shaped on a plane parallel to an axis of the windings and consists of two half rings reciprocally coupled and arranged facing and closely adjacent to each other in the direction of axis of the windings; a first circumferential portion of the core, formed by a first or both the half rings, is housed inside the carrying element and is thus surrounded by both windings, while a second circumferential portion of the core, formed by a second or both the half rings and away from the first, is arranged parallel to the first portion and radially on the outside of both the primary and secondary winding, so as not to be surrounded by the same.

According to a first possible embodiment, the half rings forming the core are shaped, on the plane parallel to the axis of the windings, as two U-shapes arranged with facing concavities thereof. In a second possible embodiment, the half rings forming the core are instead shaped, on such a plane parallel to the axis of the windings, as two L-shapes arranged with facing ends thereof.

In both cases, the half rings are reciprocally separate, in the direction of the axis of the windings, by a gap of predetermined entity and preferably as small as possible; or are in direct contact.

The carrying element comprises a drum arranged coaxial to the windings and supporting the same and the high-voltage outputs, comprising corresponding electric terminals and corresponding electric terminal supports, integrally obtained in one piece with the drum, laterally overhangingly protruding from the same.

Furthermore, the body is cup-shaped so as to define an internal concavity provided with a mouth through which the carrying element with the primary and secondary windings and the core pre-mounted on the same may be accommodated in the concavity; the concavity being filled in use with an electrically insulating resin, in which the carrying element, the windings and at least the first circumferential portion of the core are embedded.

In this manner, it is possible to concurrently obtain in use a perfect concatenation of the flux lines of the magnetic current on both windings and without substantial dispersions, thus dramatically increasing the electric efficiency of the gas lighting device, which passes from values lower than 15%, typical for the gas lighting devices marketed today, to values largely higher than 50%; and to obtain a high assembly ease of the windings, the assembly possibly being performed automatically and with a subsequent pre-assembly of the entire transformer before the final assembly on the body of the gas lighting device without altering the current layout of the gas lighting device as a whole and of the existing assembly systems.

Furthermore, the size of the gas lighting device as a whole is greatly reduced, especially in length, not only due to the saving of electric material in the windings (which also reduces production costs), consequent to the increase of efficiency but also due to the rational design of the entire structure of the gas lighting device.

Further advantages are then ensured by the fact that the high-voltage outputs may, in virtue of the described structure, be arranged at the mouth, so as to overhangingly protrude in use out from the resin, and by the fact that the electric terminal supports may be obtained at opposite ends of the drum, on both sides of the same, thus allowing to connect the opposite terminals of each coil belong to the second winding directly to the corresponding electric terminals of the high-voltage outputs.

BRIEF DESCRIPTION OF THE DRAWINGS

Further features and advantages of the invention will be apparent in the following description of a non-limitative embodiment thereof, with reference to the figures in the accompanying drawings, wherein.

BEST MODE FOR CARRYING OUT THE INVENTION

Figure 1:
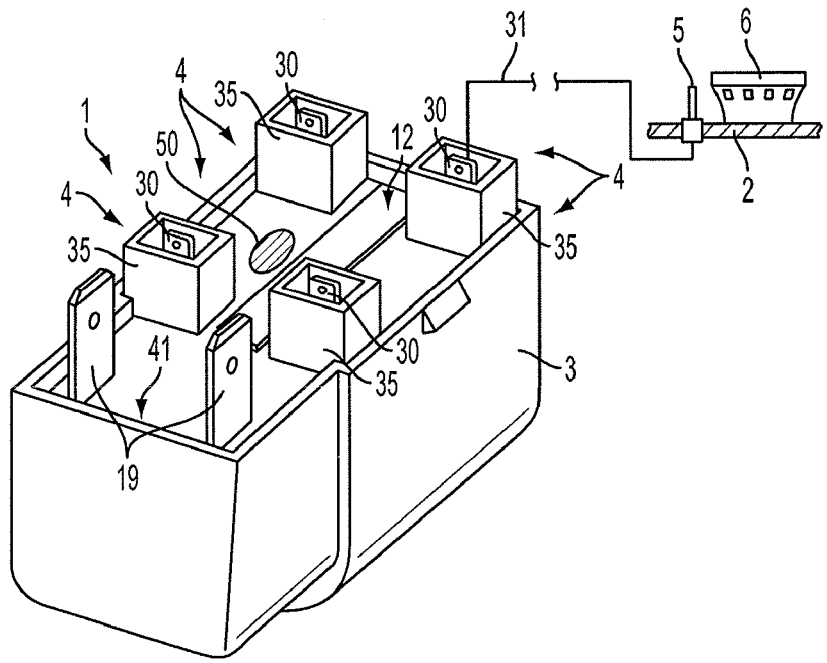
FIG. 1 shows a front three-quarter perspective view of an electronic gas lighting device made according to the invention.
Figure 2:
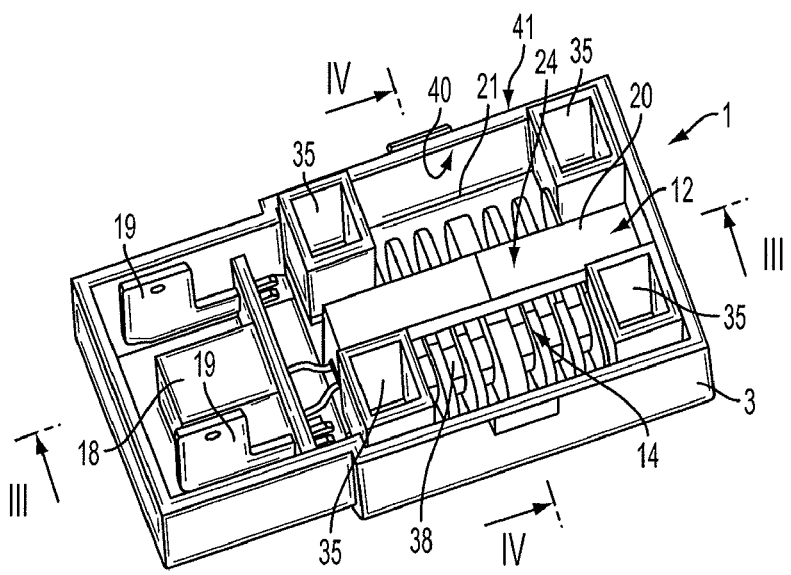
FIG. 2 shows a top three-quarter view with parts removed for simplicity of the gas lighting device in FIG. 1.

With reference to figures from 1 to 4, numeral 1 indicates as a whole a gas lighting device for an electric household appliance, which is a cooking range 2 (FIGS. 1, 3 and 4) in the non-limiting embodiment shown; the device 1 comprises a body 3 formed by an electrically insulating material, e.g. a synthetic plastic material such as polyamide, and carrying a plurality of high-voltage outputs 4 for the connection to spark generating means 5 of the cooking range 2; in the illustrated embodiment, the means 5 are spark plug electrodes integrally mounted on the cooking range 2 in known manner and each in proximity of a burner 6 (FIG. 1) of any known type adapted to equip the cooking range 2 and the body 3 is provided with known e.g. snapping, fastening means 7 (FIG. 4) to the cooking range 2, against which it may be mounted in use, in known manner (FIG. 4) at one or more fastening perforations 8 adapted to accommodate the fastening means 7.

The gas lighting device 1 further comprises a transformer 10 (FIG. 3) housed in the body 3 and in turn comprising a primary winding 11 wound around and carried by a core 12 formed by ferromagnetic material (e.g. ferrite), a carrying element 14 formed by an electrically insulating material, e.g. the same synthetic plastic material as the body 3, and designed to internally contain the primary winding 11, and a secondary winding 15 (FIGS. 3 and 4) consisting of a plurality of coils 16 externally carried by the carrying element 14, electrically insulated from the primary winding 11 and essentially coaxial with the latter.

Figure 3:
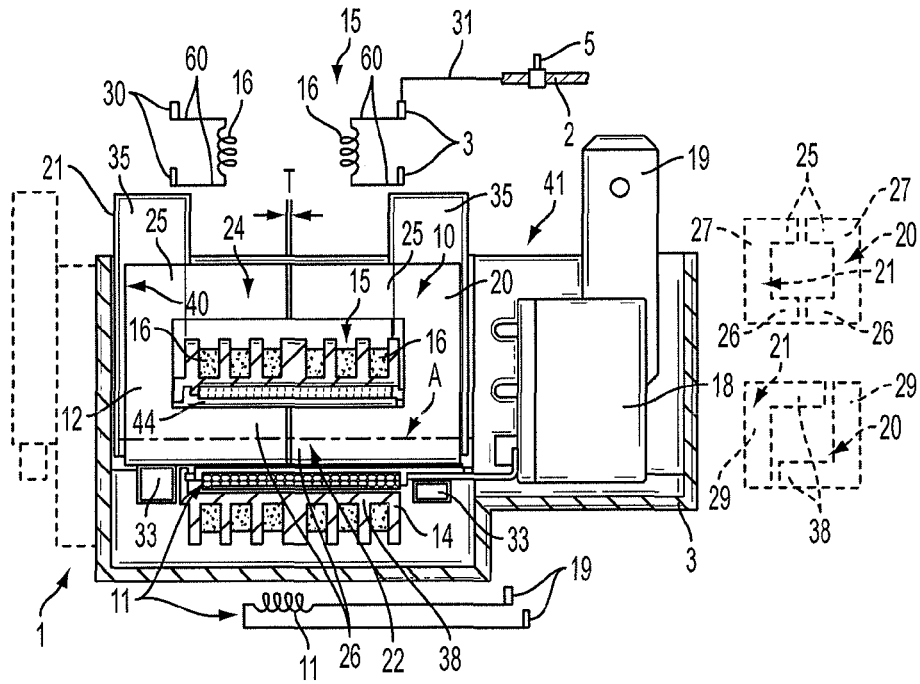
FIGS. 3 and 4 respectively show (FIG. 4 on an enlarged scale) corresponding section views taken along plotting planes III-III and IV-IV of the gas lighting device in FIGS. 1 and 2.

The gas lighting device 1 finally comprises known electronic control means 18 also accommodated in the body 3, and a pair of power supply contacts 19, e.g. of the faston type. In FIG. 3, the windings 11 and 15 are also diagrammatically shown, separated from the rest of the figure, by means of their wiring diagram for a better understanding.

According to a first aspect of the invention, the core 12 is ring-shaped on a plane parallel to an axis A of the windings 11 and 15, coinciding with the plane of the sheet in FIG. 3, and consists of two half rings 20,21 reciprocally coupled and arranged facing and closely adjacent to each other in the direction of axis A; for a better understanding, the half rings 20,21, are also diagrammatically illustrated by a dotted line in FIG. 3 on a reduced scale, arranged out of the body 3 and by the side of the rest of the figure, according to two possible embodiments of the same, as will be seen.

A first circumferential portion 22 of the core 12, formed, as will be seen, by a first or both the half rings 20,21, is housed inside the carrying element 14 (FIGS. 3 and 4) and is thus surrounded in use by the windings 11,15, while a second circumferential portion 24 of the core 12, formed by a second or both the half rings 20,21 and away from the portion 22, is arranged parallel to the portion 22 and radially on the outside of both the primary winding 11 and secondary winding 15, so as not to be surrounded by the same.

The half rings 20,21 forming the core 12 are preferably shaped, on said plane parallel to the axis A, as two U-shapes arranged with facing concavities thereof; in this case, each second circumferential portion 24 and first circumferential portion 22 of the core 12 is formed (FIG. 3, in particular the parts diagrammatically illustrated by a dotted line) by corresponding reciprocally facing branches 25 and 26 of the first U-shaped half ring 20 and of the second U-shaped half ring 21, the branches 25,26 extending parallel to the axis A and being reciprocally connected, by a base branch 27 of each half ring 20,21, which extends perpendicularly to the windings 11,15 and which is not surrounded by the same.

According to a possible alternative embodiment of the core 12 shown diagrammatically by a dotted line in FIG. 3, the half rings 20,21 forming the core 12 may be shaped, on the mentioned plane parallel to the axis A, even as two Ls, arranged with facing opposite ends thereof; in this case, each first circumferential portion 22 and second circumferential portion 24 of the core 12 is formed by a single half ring 20,21, in particular by a corresponding first wing 28 of the L formed by the first half ring 20 and second half ring 22, respectively, which extend parallel to axis A; a second wing 29 of the first half ring 20 and of the second half ring 21 is on the other hand arranged perpendicular to the wing 28 and is not surrounded by the windings 11,15.

Figure 4:
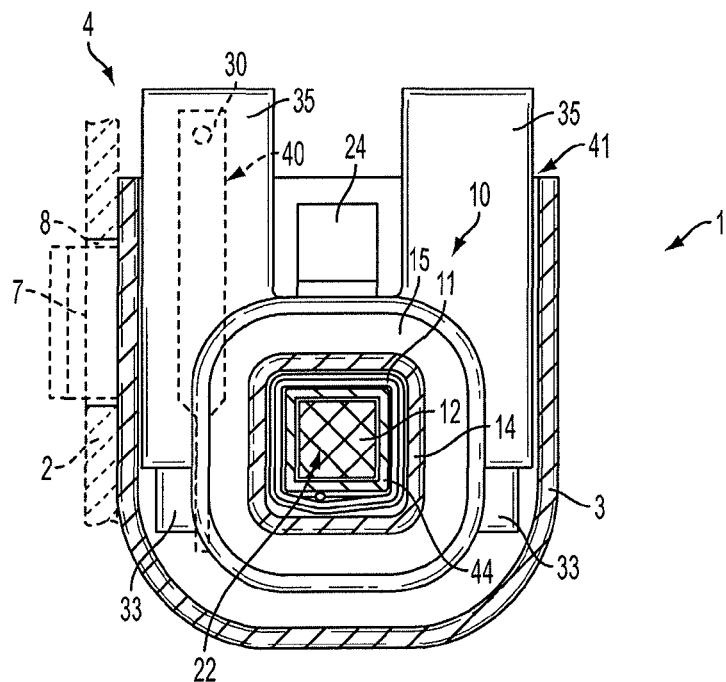

In both illustrated and described cases, the annular core 12 displays a prismatic shape and, preferably displays a square-shaped cross section (FIG. 4).

The half rings 20,21 are reciprocally separate, in the direction of the axis A, by a gap T of predetermined entity and preferably as small as possible. This may preferably also be equal to zero, in which case the half rings 20,21 are in reciprocal direct contact, in the direction of the axis A, possibly with the interposition of an insulating paint.

The high-voltage outputs 4 each comprise an electric terminal 30, preferably consisting of a male faston type strip contact (FIGS. 1 and 4) coupleable in use to electric wires 31 for connection to the electrodes 5 provided with female faston terminals, known and not shown for the sake of simplicity. Alternatively, the terminals 30 may however be made according to the teachings of a co-pending patent application to the same Applicant, in the form of flat terminals, coupleable to corresponding flat terminals (not shown) of the electric wires 31 by simple frontal facing.

According to another aspect of the invention, each high-voltage output 4 further comprises an electrically insulating support 33 for the corresponding electric terminal 30 (FIG. 4) and a prismatic tubular element 35 adapted to accommodate therein the corresponding electric terminal 30 which is integrally carried, preferably snappingly, by the corresponding support 33, arranged immediately underneath the prismatic tubular element 35.

The carrying element 14 comprises, in particular, a tubular drum 38, with a prismatic-shaped cross section in the case in point, arranged coaxially with the windings 11 and 15 and supporting the same, the winding 11 therein and the winding 15 on the external side surface thereof; as shown, the supports 33 for the electric terminals 30 are integrally obtained in one piece with the drum 38, so as to form an integral part of the carrying element 14 therewith and laterally overhangingly protrude from the drum 38.

According to a further aspect of the invention, moreover, the body 3 is cup-shaped so as to define an internal concavity 40 provided with a mouth 41 through which the carrying element 14 may be accommodated, with the primary winding 11 and the secondary winding 15 and with the core 12 pre-mounted on the same; for this purpose, the winding 11 is also preferably windingly mounted on a tubular carrying element 44 thereof (FIGS. 3 and 4) coaxial with the drum 38, which is inserted in the drum 38 after having been pre-mounted on the same of the winding 11 and in which the branches 26 of the U-shaped half rings 20, 21 defining the circumferential portion 22 of the core 12 are then inserted.

The concavity 40 is in use filled with a known electrically insulating resin 50, in which according to the invention, there are embedded not only the carrying elements 14 and 44 and the windings 11 and 15 (which thus remain electrically insulated), but also most of the half rings 20, 21, in particular at least the part thereof forming the first circumferential portion 22 of the core 12; as shown, in practice, only one side surface of the upper branches 25 of the half rings 11,15 remains in use uncovered, i.e. not embedded in the resin 50, because it is arranged essentially in line with (or immediately away from) the mouth 41.

Preferably and according to a last aspect of the invention, also the prismatic tubular element 35 of each high-voltage output 4 is integrally obtained in one piece with the corresponding support 33 immediately underneath, so as to form an integral part of the carrying element 14 as well; thus, the latter is housed within the concavity 40 with the prismatic tubular elements 35 (and the corresponding electric terminals 30) facing towards the outside of the concavity and protruding outwards from the same through the mouth 41, so as to overhangingly protrude in use out from the resin 50, obtaining in this manner a simple and cost-effective positioning of the outputs 4, instead of having to be obtained integrally with the body 3, as in the known art.

Finally, the supports 33 for the electric terminals 30 are preferably obtained at opposite ends of the drum 38, on both sides of the same, to obtain a symmetric arrangement with respect to the half rings 20,21 and to the axis A. In combination with this feature, it is thus possible to directly connect the two opposite terminals 60 (FIG. 3, diagrammatic part) of each coil 16 belonging to the second winding 15 to respective electric terminals 30 of the high-voltage outputs 4 adjacent thereto, while the opposite ends of the winding 11 are connected to the electric terminals 19, by making the electric wire forming the winding 11 run in direction of the axis A between the winding 11 itself and the support 44 thereof.

An extremely simple electric connection of the coils 16 to the terminals 4 is thus obtained, which allows to avoid internal passages of the electric wire in the concavity 40 and to avoid the need to cut the electric wire while performing the coiling operation of the winding 15. If more than four high-voltage outputs 4 are required (because the cooking range 2 to be equipped has more than four burners) it will be enough to elongate the drum 38 (and the body 3 intended to contain it), as shown by a dotted line in FIG. 3, operating in this case the winding of the additional coil(s) 16 in the same way as described in EP-A-1469255, thus preserving the possibility of automatically pre-mounting the windings 11,15 on the corresponding supports 14,44.

The invention claimed is:

1. A gas lighting device, comprising:
a body formed by an electrically insulating material and carrying a plurality of high-voltage outputs for connection of spark generating units;
a transformer accommodated in the body and including
a ferromagnetic material core,
a primary winding wound about and carried by the ferromagnetic material core,
a carrying element formed by an electrically insulating material and containing the primary winding therein, and
a secondary winding including a plurality of coils externally carried by the carrying element, electrically insulated from and coaxial with the primary winding,
wherein
said ferromagnetic material core is ring-shaped on a plane parallel to an axis of said windings and includes first and second half rings reciprocally coupled and arranged facing and closely adjacent to each other in the direction of the axis of said windings;
a first circumferential portion of the core, formed by the first half ring or both the half rings, is accommodated inside the carrying element and surrounded by said windings,
a second circumferential portion of the core, formed by the second half ring or both the half rings and away from the first circumferential portion, is arranged parallel to the first circumferential portion and radially on the outside of both said primary and secondary winding, so as not to be surrounded by said windings,
said carrying element includes a drum coaxially arranged with said windings and supporting the windings,
said high-voltage outputs each includes an electric terminal, and an electrically insulating support for the electric terminal, the electrically insulating support being integrally formed in one piece with the drum; and
the electrically insulating supports for the electric terminals are formed at opposite ends of said drum, on both sides of each of said ends.

2. The gas lighting device according to claim 1, wherein
said half rings forming said core are shaped, on said plane parallel to the axis of the windings, as two U-shapes having facing concavities;
each of said first and second circumferential portions of the core is formed by corresponding facing branches of the first and second U-shaped half rings,
the branches are reciprocally adjacent to each other and extend parallel to the axis of the windings, the branches being reciprocally connected by a base of each half ring, and the branches extending perpendicularly to the windings without being surrounded by the windings.

3. The gas lighting device according to claim 1, wherein
said half rings forming said core are shaped, on said plane parallel to the axis of the windings, as two L-shapes having facing opposite ends;
each of said first and second circumferential portions of the core is formed by a corresponding first wing of the L-shape of the respective first or second half ring, the first wing extending parallel to the axis of the windings; and
a second wing of the L-shape of each of the first and the second half rings is arranged perpendicular to the respective first wing without being surrounded by said windings.

4. The gas lighting device according to claim 1, wherein said ferromagnetic material core has a prismatic shape.

5. The gas lighting device according to claim 1, wherein said half rings are reciprocally separate, in the direction of said axis of the windings, by a predetermined gap.

6. The gas lighting device according to claim 1, wherein said half rings are in reciprocal direct contact, in the direction of said axis of the windings.

7. The gas lighting device according to claim 1, wherein said high-voltage outputs each further comprise
a prismatic tubular element that accommodates said corresponding electric terminal integrally carried by the corresponding support.

8. The gas lighting device according to claim 7, wherein said supports for the electric terminals laterally overhangingly protrude from the drum.

9. The gas lighting device according to claim 8, wherein
said body formed by electrically insulating material is cup-shaped so as to define an internal concavity provided with a mouth through which said body receives in said concavity said carrying element with said primary and secondary windings and said core pre-mounted thereon;
said concavity being filled with an electrically insulating resin, in which said carrying element, said windings and at least said first circumferential portion of the core are embedded.

10. The gas lighting device according to claim 9, wherein
said prismatic tubular element of each said high-voltage output is integrally formed in one piece with the corresponding support, so as to be an integral part of said carrying element;
the carrying element is accommodated within said concavity with said prismatic tubular elements facing towards the outside of said concavity and protruding outwards from the concavity through said mouth, so as to be overhangingly protruding out from said resin.

11. The gas lighting device according to claim 1, wherein opposite ends of each said coil belonging to the second winding are electrically directly connected to the corresponding adjacent electric terminals of the high-voltage outputs.

12. The gas lighting device according to claim 1, wherein said ferromagnetic material core has a square-shaped cross section.

13. The gas lighting device according to claim 7, wherein each of the electric terminals includes a faston type strip contact.

* * * * *